Figure 1:
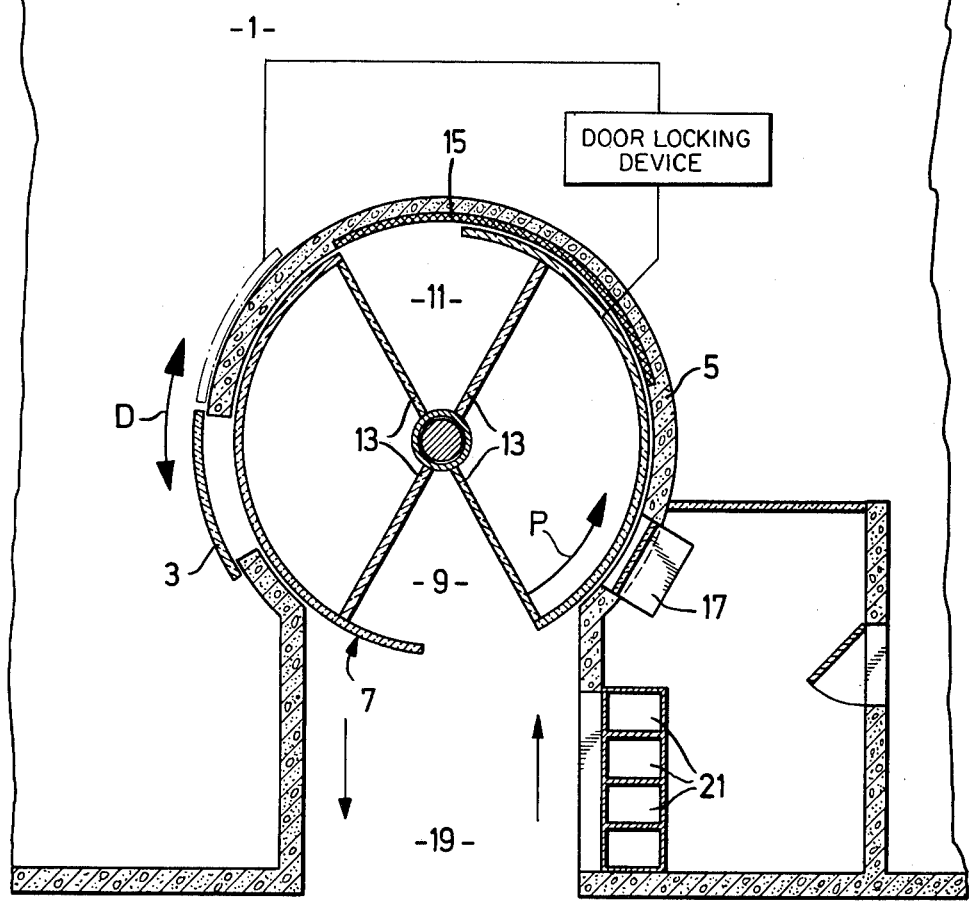

United States Patent [19]

Lagarrigue

[11] 4,060,039
[45] Nov. 29, 1977

[54] SECURITY SYSTEM

[76] Inventor: Serge Lagarrigue, Domaine d'Escosse, F 78 Chevreuse, France

[21] Appl. No.: 583,725

[22] Filed: June 4, 1975

[30] Foreign Application Priority Data

June 6, 1974 Germany ............................ 2427359
May 6, 1975 Germany ............................ 2520077

[51] Int. Cl.² ............................................. E05G 5/02
[52] U.S. Cl. .......................................... 109/3; 109/8; 340/258 C
[58] Field of Search .......................... 109/2, 3, 6, 7, 8; 324/41; 340/258 R, 258 C, 280

[56] References Cited

U.S. PATENT DOCUMENTS

| 1,971,549 | 8/1934 | Woodward | 340/258 C |
| 1,992,096 | 2/1935 | Reger | 109/8 |
| 2,004,551 | 6/1935 | Coleman et al. | 109/3 |
| 2,179,240 | 11/1939 | Breitenstein | 340/258 C |
| 3,779,178 | 12/1973 | Riseley | 109/6 |

Primary Examiner—Paul R. Gilliam
Assistant Examiner—David H. Corbin
Attorney, Agent, or Firm—William Anthony Drucker

[57] ABSTRACT

The invention covers a protective device in the outer area of a room, for instance a banking hall of a financial institution, with a bullet-proof door, which can be locked, leading into a room, the locking mechanism being operated in conjunction with a release device.

6 Claims, 4 Drawing Figures

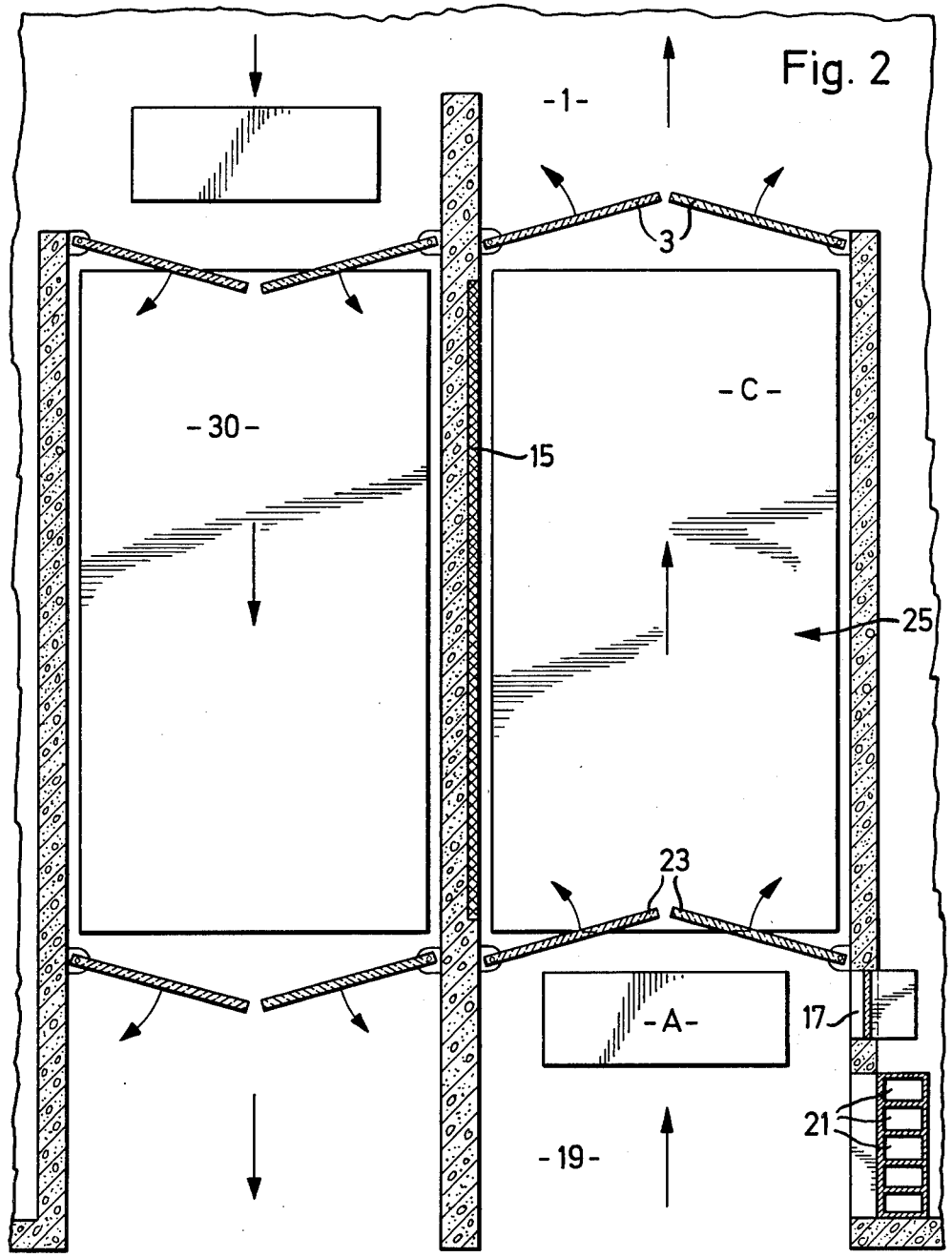

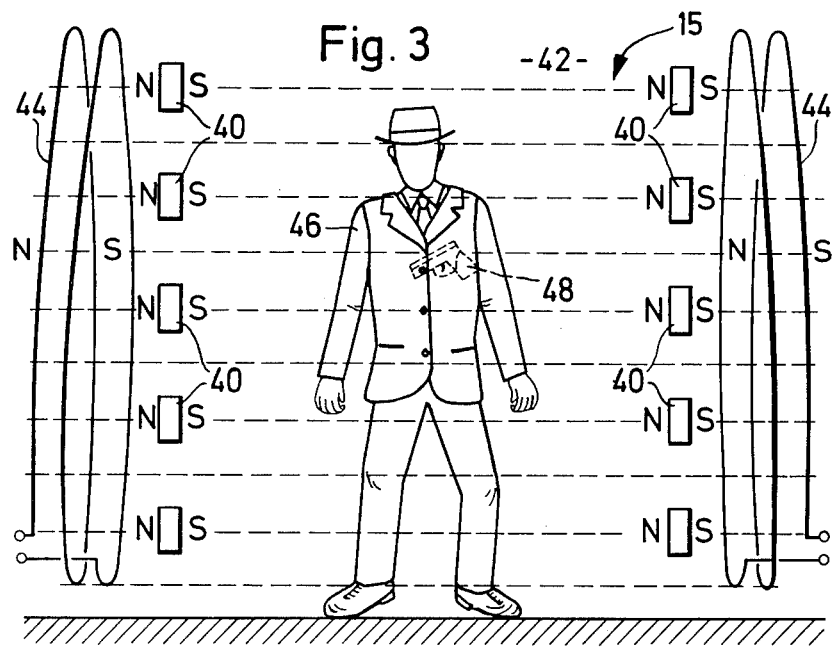
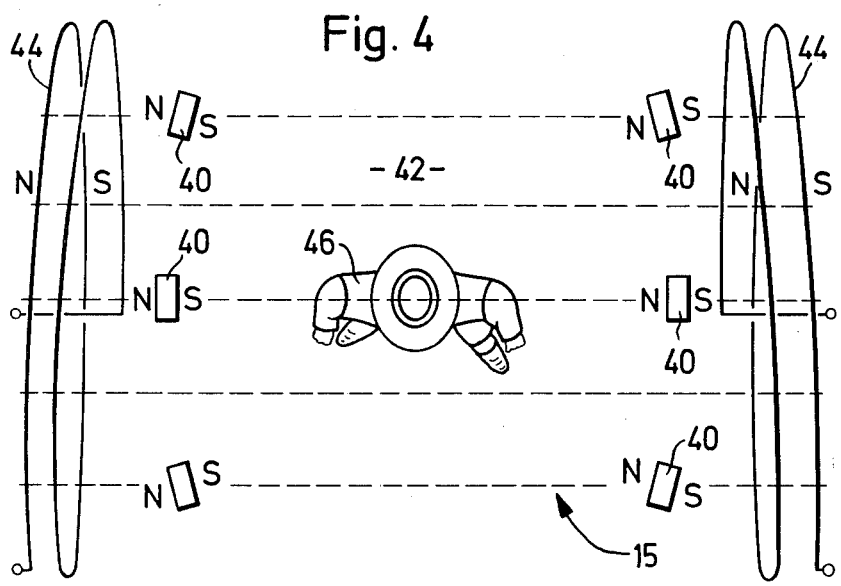

SECURITY SYSTEM

With a well-known device of this type (U.S. Pat. No. 3,413,934), the door leading into the room, together with another door leading to the outside, for instance, forms a part of a bullet-proof ante-room, through which one has to pass if one wants to enter or leave the room. The second door also has a lock, this like-wise being combined with a release mechanism. The release mechanism operates electrically and has to be operated by a person if the doors are to be locked. It is designed in such a way that after it has been operated, the door leading to the outside is locked and with a pre-set time lag the door leading into the room is then locked. A device of this kind can be used as a trap and is, for instance, suitable when the area around the counter of a financial institution is concerned, for preventing a bank robber from escaping after committing a crime and for retaining him in the ante-room.

In accordance with a further well-known device a revolving door, the revolving of which can be locked, is provided at the exit of the room connecting this with the outer area; the lock of the revolving door can also be operated electrically by a person, in order in this way to block the exit of the room.

A disadvantage of the conventional devices is that they do not operate automatically and in particular, they are as a rule only very late in a position to take defensive measures in the course of events during a bank raid. As a rule they can only prevent a hold-up from being successful in the end, but not from being carried out at all. This drawback is shared by other well-known devices, such as remote control of the room with television cameras, alarm equipment operated by counter clerks or the protecting of the actual tellers' counters by armoured glass. In the light of the ever more frequent taking of hostages in the banking hall during the raid, these measures are found to be inadequate to an increasing extent, as they are of no use if one does not want to endanger the lives of innocent people. A need has therefore arisen for devices which can prevent a bank robbery or similar situation even before it actually happens, for instance by armed persons being automatically prevented from entering the room exposed to danger.

The task of the invention is accordingly to design a protective device of the type mentioned at the beginning in such a way that with the approach of a weapon at the door from the outer area, this is automatically locked.

According to the invention, this task is fulfilled by a weapon detector being provided as release device in the region of the door, outside the room. Therefore if a person, who is armed, approaches the door, this is automatically locked, so that the person is prevented from entering the room. The taking of hostages by armed persons in the protected room is thus made almost impossible.

The weapon detector can preferably operate on a magnetostatic basis with induction loops or for instance on a high-frequency basis with induction loops, as they are also used in air passenger control at airports. In principle X-rays are also feasible as means of detection. Improved detection systems could show, for instance, mass-spectrometrically, the sudden presence, even only traces of them, of certain chemical substances, such as gun-powder, tear gas etc. A further increased reliability and selectivity of detection can be achieved by a combination of several such systems.

In accordance with a preferred form of construction of the protective device according to the invention, the door forms a part of the bullet-proof surround of a revolving door, divided by bullet-proof partial walls, situated outside the room, and the weapon detector is arranged in an area of the revolving door, situated in front of the door as seen in the direction in which the door revolves. By means of the revolving door, the flow of people making for the door can be separated, especially when the accessible sectors of the revolving door accommodate only one person at a time. In this way, detection aimed at a specific person can be carried out.

In order to be able to detain suspicious persons, if necessary, the movement of the revolving door can be preferentially blocked and the weapon detector also works in conjunction with the locking of the revolving door.

In accordance with another form of construction of the protective device, which can be used to advantage, the area is formed by a passageway situated between the door leading into the room and a second door, a device being provided to block the second door in closed position when the door leading into the room is open and/or a person is in the passageway.

Here too, in order to be able to detain suspicious persons, the second door can be made to lock, and the weapon detector can operate in conjunction with the locking of the second door.

Preferably the sensitivity of the detector is adjustable, so that for instance a metal detector can be so adjusted that it does not respond to fairly small metal objects, such as buckles, ball-point pens, keys, coins etc.

So that objects which are harmless, but would nevertheless be detected, can be brought into the protected area in spite of the protective device — here bags of coins in the case of a bank, for instance, should be considered — bullet-proof hatches can be provided in addition to the protective device. Likewise, safe deposit boxes can be placed in the vicinity of the protective device, in which persons, who wish to enter the protected area can deposit objects which are subject to being detected.

The more selective the weapon detector is in actually responding only to weapons and not to other objects also, the less is the public hindered by the protective device in the room to be protected.

As weapons are as a rule made of steel, a weapon detector which only responds to ferro-magnetic metals and not to other, such as copper, aluminium etc. also, is particularly suitable.

From this point of view, the detection of weapons by the measuring of changes in high-frequency electromagnetic fields is ruled out, as such changes are brought about by metals of any kind. For the detection solely of ferro-magentic metals, above all the measuring of changes in static magnetic fields offers itself.

To start with attempts were made to select an arrangement, with which there is a source of a static magnetic field, for instance a permanent magnet or an electro-magnet (through which flows a constant current) on one side of an area to be crossed with a weapon, and on the other side an induction loop, which responds to temporary changes $dF/dt$ of the magnetic flux $F$ passing through it by the emission of an electric voltage.

However, this arrangement has disadvantages insofar as this change of the magnetic flux depends very much on how far from the induction loop the weapon is passed between it and the magnet. The nearer to the magnet this happens, the greater is the change in the magnetic flow in the induction loop on account of the then stronger screening effect through the weapon.

The invention provides a remedy here through the weapon detector comprising magnetic field sources being arranged on opposite sides of an area to be crossed by customers and filling it with a magnetic field induction loops being adjoined to the magnetic field sources, and an electronic device which is averaging or adding the induction voltages being generated in the induction loops of the opposite sides of the area to be crossed. As a result, the reading obtained is practically independent of the question of where the weapon is taken through the area between the sources of the magnetic field, so that the threshold of operation can be set at a very critical level.

It is especially simple to realise the magnetic field sources as ferrite magnets arranged side by side, as these develop high field strengths with handy and space-saving dimensions.

In order to construct the area to be crossed sufficiently wide, it is advisable to arrange the ferrite magnets in such a way that the pole surfaces of the ferrite magnets of each magnet field source define a surface curved concavely towards the area to be crossed. For in this way a field strength distribution is achieved, for which at an equal distance from the pole surface, the field strength is higher than with an arrangement with which the pole surfaces of the two magnetic field sources are arranged in planes.

It has been found advisable for the induction loops to be arranged on the sides of the ferrite magnets turned away from the area. At these points the changes in the magnetic flux in relation to the quiescent flux generated by ferro-magnetic objects brought into the area are great, so that a weapon detector so designed operates sensitively.

It is furthermore advantageous to screen the induction loop on the outside, i.e. on the side turned away from the area to be crossed, by ferro-magnetic plates, so that ferro-magnetic objects taken past the induction loops outside the area cannot produce any interference effects.

The design of the weapon detector in accordance with the application can already be regarded as an invention in itself.

Further features of the invention are evident from the following description of preferred forms of construction of a protective device in conjunction with the enclosed drawing. In this FIG. 1 is a protective device with a revolving door in plan view, and FIG. 2 is a protective device with a passageway situated between two doors, also in plan view, FIG. 3 shows in detail the arrangement of the units of a preferred weapon detector of the protective device, viewed from the front, FIG. 4 is a plan of this.

FIG. 1 shows a room 1, which can be entered or left through a bullet-proof door 3. The door 3 moving in the direction of the double arrow D forms part of a bullet-proof surround 5 of a revolving door 7. The revolving door 7, which can only revolve in the direction of the drawn-in arrow P, has two sections 9 and 11, spaced apart for 180°, which can be entered, the size of which is so selected that they can accommodate only one person each. The walls 13 of the sections are also of a bullet-proof construction. In an area of the surround 5 situated in front of the door 3, seen in the revolving direction of the revolving door (shown diagrammatically) a weapon detector 15 is arranged. In the vicinity of the entrance 19 to the revolving door there is in addition a bullet-proof hatch 17 leading into room 1 for the passing through of objects. In the entrance 19 safe deposit boxes 21 are arranged.

The sequence of operations of the protective device is as follows:

A person entering section 9 or 11 of the revolving door 7, which can accommodate one person only, from the entrance 19, moves with it in the direction of the arrow P, and comes within the range of the weapon detector 15. If it is triggered off, the usually open door 3 closes, so that the person — if the revolving door is not locked by the weapon detector 15 at the same time as door 3 — is forced to leave the revolving door again at entrance 19 without having achieved his object.

Objects which produce a reaction from the weapon detector 15 as governed by the system, but which must nevertheless be taken into room 1, can be handed to persons employed there through the hatch 17. An example of this are sacks with coins, which are to be taken into a bank to be changed. Objects, which are not required in room 1, but which would also produce a response from the weapon detector, can be deposited in the safe deposit boxes 21.

With the method of operation of the protective device with a blocking of the revolving door by the responding weapon detector 15, locking takes place in such a way that one of the two sections 9 or 11, which can be entered, is always connected to the entrance. In this way a second person, who is in the section not in the detection area (in section 9 in accordance with FIG. 1), for instance coming out of room 1, can leave the revolving door 7 unhindered when it is blocked.

The revolving door form of construction of the protective device can at the same time serve as entrance and exit of room 1 and despite a high degree of protection by means of reliable separation of the flow of people, makes possible a largely smoothly-circulating flow of people between the outer area and room 1.

This applies especially in those cases where a locking of the revolving door to check the person triggering off the weapon detector is done away with. The revolving door form of construction of the protective device should therefore be regarded as especially preferred.

FIG. 2 shows an arrangement with a door leading into room 1 and opening in the direction of the movement of customers and a door 23 also opening in the direction of movement. Between them runs a passageway 25. A weapon detector 15 is arranged in one of the bullet-proof walls of the passageway (shown diagrammatically). A contact surface C covers the floor of passageway 25, similarly there is a further contact surface A in the entrance 19 to the second door 23. In addition there are a bullet-proof hatch 17 leading into room 1 for the handing through of objects, and safe deposit boxes 21 arranged in entrance 19.

The sequence of operations of the protective device just described is as follows:

When contact area A is stepped on, the second door 23 opens, provided contact area C remains untouched. A person, who in this way arrives in passageway 25 thus comes within the range of the weapon detector 15. If it is triggered off, at least door 3 leading into the room is locked, so that the person is prevented from entering the room and when the second door 23 is also locked, is caught in passageway 25. Only if the weapon detector 15 is not triggered off, does door 3 open automatically or manually — not until door 2 is already closed, of course — so that the person can enter room 1. So long as door 3 is in the open position, or contact surface is loaded (or both), contact surface A is out of action, so that the second door 23 cannot be opened from the outside.

The purpose of hatch 17 and safe deposit boxes 21 is the same as described in connection with FIG. 1.

A door arrangement 30 which is similarly arranged, though with movement in reverse direction, as the protective device just described serves for the leaving of the room 1. The weapon detector can be omitted with door arrangement 30. The door arrangement 30 cannot be opened from the side of the entrance 19.

In the form of construction of the weapon detector shown in FIGS. 3 and 4, ferrite magnets 40 are areally arranged in two groups opposite each other in such a way that the area 42 situated between the groups is filled by a magnetic field. Each of these groups represents a magnetic field source. The magnets of one group, as well as the two groups among one another, are, as is indicated on the magnets by the symbols N for north pole and S for south pole, polarized in the same direction. Height and width of the area 42 are geared to human dimensions. The pole surfaces of the ferrite magnets of a group define a surface curved concavely towards area 42 (for reasons of clarity only the centre column of magnets of each group is shown in FIG. 3). In each case there is an induction coil 44 as induction loop on the sides of the ferrite magnets 40 turned away from area 42. A low constant voltage producing a weak direct current is suitably applied to the induction coils (with the result of a weak magnetic field indicated by N and S on the coils). This means a more favourable position of the operating point of the electronic device and suppresses undesirable effects through fields of interference.

In area 42 a person 46 is shown carrying a pistol 48. By bringing the pistol into the area, changes occur in the magnetic fields generated by the magnets and thus currents are induced in the two coils 44. The mean value of these induction voltages is largely independent of where the pistol 48 is carried through area 42. If the weapon detector described is used with the revolving door form of construction of the protective device shown in FIG. 1, one group of magnets 40 and a coil 44 should be arranged in the region of the axis of the revolving door, the other group of magnets and other coil in the region of the surround. The length measurements of the area 42 have then to be selected correspondingly shorter than shown in the drawing.

With the form of construction of the protective device in accordance with FIG. 2, area 42 forms a part of the passageway 25, and a group of magnets 40 and a coil 44 are arranged on one of its sides, the other group of magnets and other coil on its other side.

What is claimed is:

1. A security system for the outer area of a room comprising a bullet-proof revolving door having a circular outer wall with an opening therein leading into the room and an exit, a movable door movable along said outer wall to close said opening, a release device and means for locking the movable door in combination with said release device, said release device being a weapon detector which is positioned in the region of the revolving door outside the room, the movable door forming part of a bullet-proof surrounding of said revolving door divided by bullet-proof partition walls forming plural compartments of a first type separated by plural compartment of a second type, said compartments of said first type including an exit passage and said compartments of said second type having no exit passage, only one of said compartments of said first type being adjacent said movable door at a given time, said walls being situated outside the room, said weapon detector being disposed in an area situated in front of the movable door as seen in the revolving direction of the door.

2. In a system in accordance with claim 1, the improvement in which means are provided to block the revolving door in its revolving motion and the weapon detector cooperates with the means blocking the revolving door.

3. In a system in accordance with claim 1 the improvement in which the weapon detector includes constant magnetic field sources arranged on opposite sides of an area to be crossed to produce therein a magnetic field, induction loops and means averaging or adding the induction voltages generated to the induction loops.

4. In a system in accordance with claim 3, the improvement in which each magnetic field source is formed by ferrite magnets arranged side by side.

5. In a system in accordance with claim 4, the improvement in which the pole surfaces of the ferrite magnets of each magnetic field source define a surface curved concavely towards the area.

6. In a system in accordance with claim 3 the improvement in which the induction loops are arranged on the sides of the ferrite magnets turned away from the area.

* * * * *